United States Patent [19]

Wilner

[11] Patent Number: 4,737,473

[45] Date of Patent: * Apr. 12, 1988

[54] PIEZORESISTIVE TRANSDUCER

[75] Inventor: Leslie B. Wilner, Palo Alto, Calif.

[73] Assignee: Endevco Corporation, San Juan Capistrano, Calif.

[*] Notice: The portion of the term of this patent subsequent to Feb. 12, 2002 has been disclaimed.

[21] Appl. No.: 716,070

[22] Filed: Mar. 26, 1985

[51] Int. Cl.⁴ .................... H01L 41/08; G01L 1/22
[52] U.S. Cl. ................... 437/154; 437/187; 437/226; 437/228; 437/901; 357/26; 338/2
[58] Field of Search .............. 357/26, 55; 156/662; 369/152; 310/311, 319, 328; 338/2, 6, 42; 73/775, 777, 781; 437/154, 226, 228, 187, 901

[56] References Cited

U.S. PATENT DOCUMENTS 3,638,481  2/1972  Wilner ................ 73/141 A
3,912,563 10/1975  Tomioka et al. ........ 156/13
4,498,229  2/1985  Wilner ................ 29/580

OTHER PUBLICATIONS

Ghandi, VLSI Fabrication Principles–Silicon and Gallium Arsenide, John Wiley & Sons, New York, 1983 pp. 421–424.

Primary Examiner—Olik Chaudhuri

[57] ABSTRACT

A strain sensitive element for use in a system for converting mechanical movement of relatively movable portions of the element into electrical signals, includes a substantially planar substrate comprising an N-type silicon crystal material wherein the substrate includes groove means extending into the substrate defining an integral hinge portion between at least two relatively movable parts. At least one unitary strain gage extends across the groove means without any separate support so that the strain gage and the hinge portion are spaced apart. The strain gage is a unitary member derived from the same silicon crystal material of the substrate and comprises P-type silicon material. The strain gage is joined to two of the relatively movable parts of the substrate. At least one unitary conductor extends across the groove means without separate support so that the conductor and the hinge portion are spaced apart. The conductor is derived from the same silicon material as the substrate and comprises P-type silicon material. The conductor is oriented substantially transversely with respect to the strain gage. The conductor is joined to two of the relatively movable parts of the substrate. Contact means, electrically connected to the strain gage and the conductor, is provided for allowing electrical communication with test apparatus for measuring changes in electrical resistance in the strain gage when the strain gage is subject to stress resulting from relative movement of the movable parts of the substrate.

29 Claims, 3 Drawing Sheets

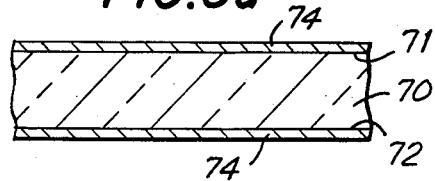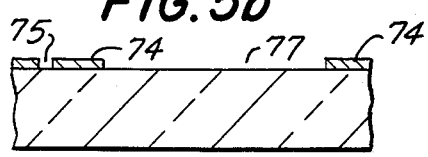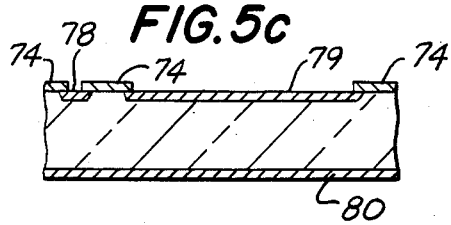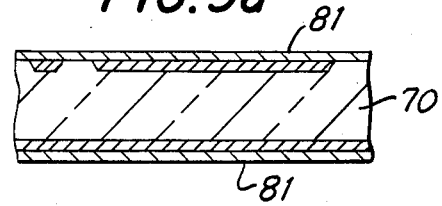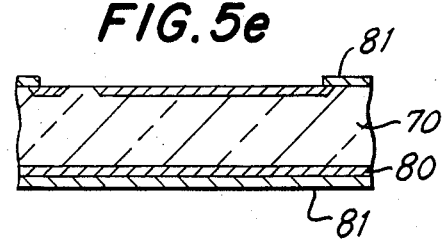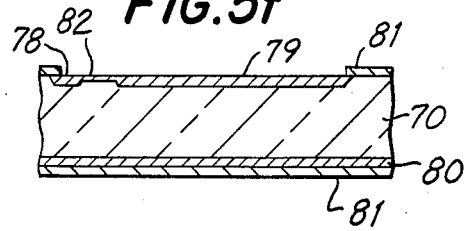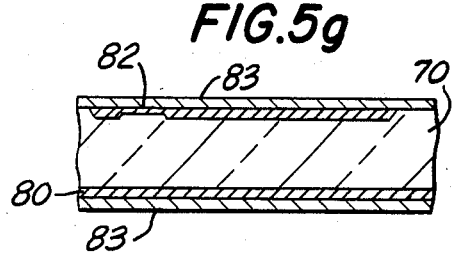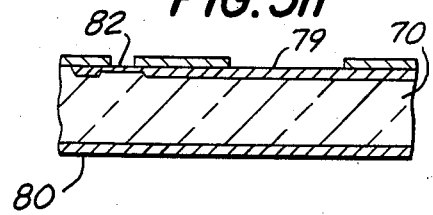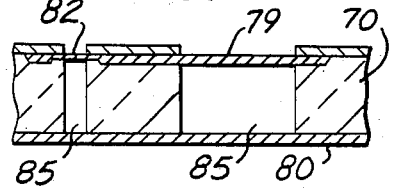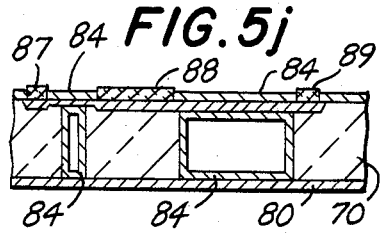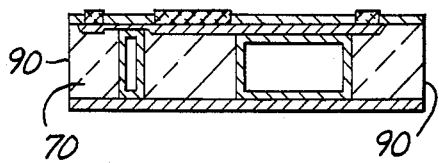

PIEZORESISTIVE TRANSDUCER

FIELD OF THE INVENTION

Generally speaking, the present invention relates to electromechanical transducers for converting mechanical movements or displacements into electrical signals. More particularly, the present invention concerns an improved strain sensitive element or force gage for use in transducers and methods of manufacturing an improved strain sensitive element.

DESCRIPTION OF THE PRIOR ART

Known electromechanical transducers whether used for measuring acceleration, force or pressure include a pressure/force sensitive element such as a diaphragm or cantilever and a strain sensing element attached to or integral with the pressure/force sensitive element.

Known transducers include unbonded wire transducers which consist of one or more wires stretched and connected between two or more points on a diaphragm and unsupported between these points. Displacement of the diaphragm stretches the wire reducing its cross-sectional area, and accordingly, increasing its resistance to the flow of electrical current in a proportional relationship to the diaphragm displacement. Also known are transducers wherein strain gages are bonded to the diaphragm using adhesives such as epoxy. These strain gages are sometimes made of thin copper alloy foil which is etched to define a gage geometry during manufacture. The foil strain gage is bonded over its entire length to the diaphragm and is not suspended therefrom. Here again, deflection of the diaphragm causes a strain in the strain gage element which changes its cross-sectional area and, accordingly, changes its resistance to the flow of electrical current.

Strain gage transducers are generally less expensive and more rugged than the larger unbonded wire transducers. Both types of transducers, however, have low gage factors (change in electrical resistance with respect to changes in strain in the gage element) and both produce hysteresis errors affecting accuracy, when the gage is subject to periodic changes in strain.

Improvements are provided by piezoresistive transducers using a single-crystal semiconductor material, such as silicon doped with boron, for a strain gage element. The semiconductor strain gage is bonded to the diaphragm and offers the advantage of high gage factor (as much as one hundred times more sensitive than metal strain gages) and small size.

Improvements have also been provided by selectively changing the thickness of the diaphragm so that it will consist of relatively thick islands and a relatively thick rim portion, separated by thin portions. Because the deflection of the diaphragm is primarily along the thin portions, the strain gages can be advantageously mounted across the thin portions in an area of maximum strain to provide increased gage sensitivity.

U.S. Pat. No. 4,093,933 to Wilner teaches a transducer structure having a pressure diaphragm composed of a nonmetallic material that has been sculptured by etching to form thick islands and a thick rim interconnected by thin sheet material. The thick portions are separated by the thin flexures in which the deflection of the diaphragm is concentrated. Piezoresistive semiconductor sensors, similar to the type described in U.S. Pat. No. 3,351,880, are bonded on opposite sides of the thin grooves and electrical connectors are metallurgically bonded to the pads of the sensors so that the sensors may be connected in a wheatstone bridge type circuit. The sculptured pressure diaphragm is desirable and advantageous because it allows mounting the solid state strain gage elements across the points of maximum deflection which in essence mechanically amplifies the strain being sensed or measured as the diaphragm responds to forces. This structure is highly desirable because of its increased sensitivity when compared to structures wherein the strain gage element is mounted directly to the diaphragm surface along the entire length of the strain gage element.

Transducers formed from a single crystal of semiconductor material wherein the strain gages are an integral part of the semiconductor diaphragm are known in the art. These transducers offer the advantage of being small in size while having a high gage factor and are easier to manufacture. Also, the integral structure eliminates the need for an adhesive joint between the diaphragm and the strain gage. The adhesive joint is a disadvantage because it is not as stable as the remainder of the crystal structure and there can be relative movement, or creep, between the portions joined by the adhesive. However, these transducers, theoretically, lack the sensitivity of transducers with a sculptured diaphragm having piezoresistive semiconductors secured across slots in the diaphragm.

In U.S. Pat. No. 4,498,229, Wilner teaches an improved piezoresistive transducer and method for making same, wherein the gages are defined upon the substrate and subsequently etched from the material of the substrate. In this piezoresistive transducer the gage element is etched free of the substrate at its midportion and is integral with the substrate at its remote end portions. This piezoresistive transducer provides all the advantages of higher sensitivity provided by the sculptured pressure diaphragm and the freed gage structures described above and it also has the advantages of the one piece integral strain gage/diaphragm structures described above.

Although the single-crystal transducer with etch-freed piezoresistive gages has many advantages over previously known and used transducers, these gages are still connected by interconnections or conductors which are etched on the surface of the substrate, but not etch-freed, or by metallic connectors between the various freed gages. Interconnections etched into the substrate act as structural members stiffening the diaphragm and undesirably reducing its sensitivity to outside forces. In the alternative, the use of metallic connectors between the etch freed gages introduces undesirable thermal expansion variations between the interconnections and the remainder of the transducer structure and the above-mentioned mechanical hysteresis problems inherent with the metallic structure. Although the prior art discloses single crystal piezoresistive transducers having etch-freed gages, there is still a need for a simple, straightforward, reliable, easily fabricated single-crystal semiconductor strain sensitive element having at least one etch-freed piezoresistive strain gage and at least one etch-freed conductor wherein the strain gage, the conductor and the element are all formed of the same silicon crystal substrate.

SUMMARY OF THE INVENTION

The operable strain sensitive element for use in a system for converting mechanical movement of relatively movable portions of the element into electrical signals, of the present invention, includes a substantially planar substrate comprising an N-type silicon crystal material. The substrate includes groove means extending into the substrate defining an integral hinge portion between at least two relatively movable parts of the substrate. At least one unitary strain gage extends across the groove means without any separate support so that the strain gage and the hinge portion are spaced apart. This strain gage is a unitary member derived from the same silicon crystal material of the substrate. The strain gage comprises P-type silicon material and is joined to two of the relatively movable parts of the substrate. At least one unitary conductor extends across the groove means without separate support so that the conductor and the hinge portion are spaced apart. The conductor is derived from the same silicon crystal material as the substrate and is comprised of P-type silicon material. The conductor is oriented substantially transversely with respect to the strain gage, when viewed from a position directed perpendicularly from the plane of the substrate. The conductor is joined to two of the relatively movable parts of the substrate. Contact means, electrically connected to the strain gage and to the conductor, are provided for allowing electrical communication with test apparatus for measuring changes in the electrical resistance in the strain gage when the strain gage is subject to stress resulting from relative movement of the movable parts of the substrate.

In another aspect of the present invention, a process for producing an operable strain sensitive element having at least one etch-freed piezoresistive strain gage and at least one etch-freed conductor passing over a groove in the element, comprises: selecting a planar N-type silicon crystal element with the plane of the element oriented substantially about (110), wherein the element includes a gage side and an opposed back side; forming, in a first forming step, an oxide layer on the gage side of the element; defining, in a first defining step, on the oxide layer of the gage side, a conductor indexed generally about [111] by opening a conductor aperture in the oxide layer corresponding to the defined conductor; diffusing, in a first diffusion step, boron into the conductor aperture from the first defining step; defining, in a second defining step, on the oxide layer of the gage side, a strain gage indexed about [111] by opening a gage aperture in the oxide layer corresponding to the defined strain gage; diffusing, in a second diffusion step, boron into the gage aperture from the second defining step; defining, in a third defining step, an etching pattern on the gage side defining a groove to be formed in the element over which the conductor and the strain gage will extend; etching, in an etching step, in the etching pattern to a depth necessary to undercut the conductor and the strain gage and to form the groove, the groove having a base portion at the area of deepest penetration of the groove into the element, the base portion and the back side defining a residual thickness in the element; stripping, in a stripping step, the residual oxide layers from the element; forming, in a fourth forming step, an oxide layer on all surfaces accessible from the gage side of the element; defining, in a fourth defining step, a contact pattern on the gage side defining contacts; and depositing, in a first depositing step, a metallic layer in the contact pattern, the metallic layer adapted to be connected with outside conductors.

In another embodiment, of this other aspect of the present invention, a process for producing an operable strain sensitive element having at least one etch-freed piezoresistive strain gage and at least one etch-freed conductor passing over a groove in the element, comprising: selecting a planar N-type silicon crystal element with the plane of the element oriented substantially about (110), the element having a gage side and an opposed back side; forming, in a first forming step, an oxide layer on the gage side of the element; defining in a first defining step, on the oxide layer of the gage side, a conductor indexed generally about [111] and a strain gage indexed about [111] by opening a conductor aperture and a strain gage aperture in the oxide layer corresponding to the defined conductor and the defined strain gage; diffusing, in a diffusion step, boron into the apertures from the first defining step; defining, in a second defining step, an etching pattern on the gage side defining a groove to be formed in the element over which the conductor and the strain gage will extend; etching, in an etching step, in the etching pattern to a depth necessary to undercut the conductor and the strain gage and to form the groove, the groove having a base portion at the area of deepest penetration of the groove into the element, the base portion and the back side defining a residual thickness in the element; stripping, in a stripping step, the residual oxide layers from the element; forming, in a second forming step, an oxide layer on all surfaces of the element accessible from the gage side; defining, in a third defining step, a contact pattern on the gage side defining contacts; and depositing, in a first depositing step, a metallic layer in the contact pattern, the metallic layer adapted to be connected with outside conductors.

BRIEF DESCRIPTION OF THE DRAWINGS

FIGS. 5a through 5k are cross-sectional views showing successive steps of a method of manufacturing the strain sensitive element of the present invention.

DETAILED DESCRIPTION

Figure 1:
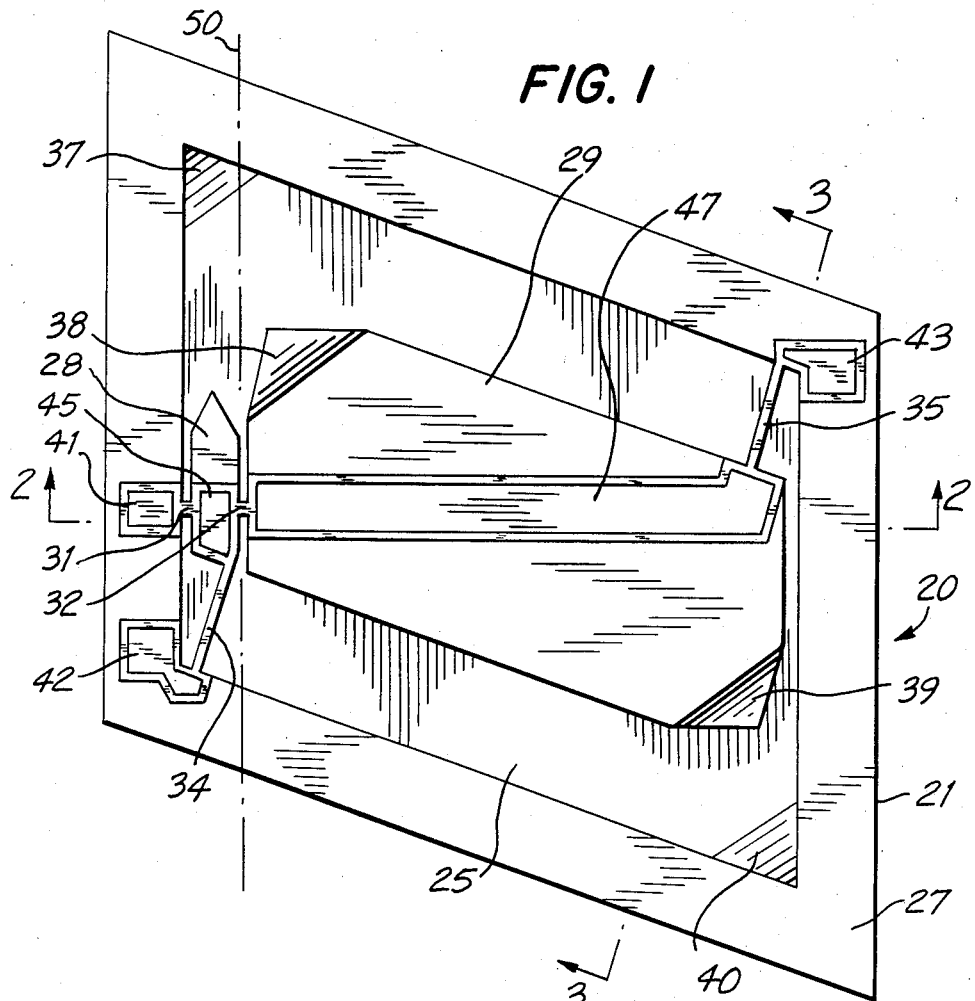
FIG. 1 is a top plan view of the preferred strain sensitive element of the present invention.

While this invention is satisfied by embodiments in many different forms, there is shown in the drawings and will herein be described in detail preferred embodiments of the invention with the understanding that the present disclosure is to be considered as exemplary of the principles of the invention and is not intended to limit the invention to the embodiments illustrated. The scope of the invention will be measured by the appended claims and their equivalents.

Figure 2:
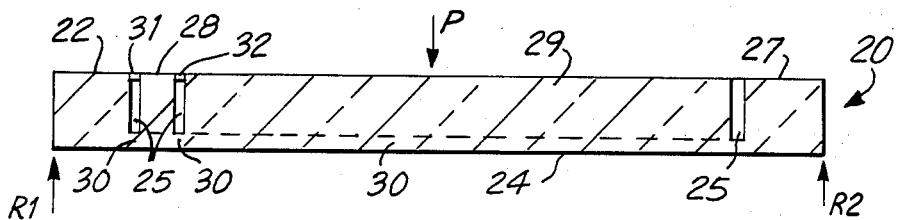
FIG. 2 is a cross-sectional view of the element of FIG. 1 taken along line 2—2.
Figure 3:
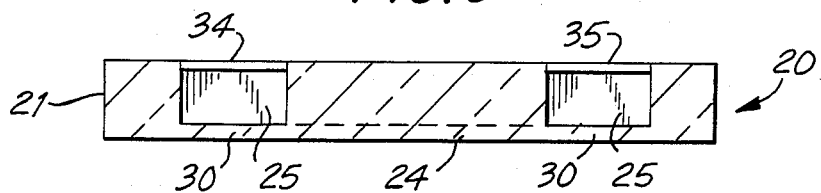
FIG. 3 is a cross-sectional view of the element of FIG. 1 taken along line 3—3.
Figure 4:
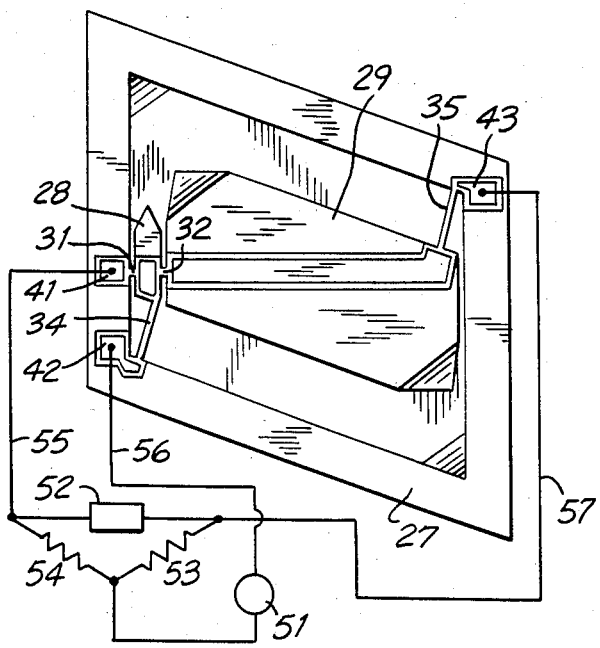
FIG. 4 is a top plan view of the preferred strain sensitive element illustrating the element connected with externally supplied electrical components to form a bridge circuit.

Adverting to FIGS. 1-3, a strain sensitive element 20 includes a substantially planar substrate 21 comprised of piezoresistive semi-conductive material such as N-type silicon crystal having a gage side 22 and a back side 24 with groove 25 extending into the substrate from the gage side. Substrate 21 includes a rigid peripheral rim portion 27, a first island 28 and a second island 29. The first and second island are separated from each other and the rim portion by groove 25. The base of groove 25 defines a relatively thin hinge portion 30. The thin structure of the substrate in the area of the hinge portion makes the hinge portion relatively flexible with respect to the thicker portions defined by the rim and the islands. A first strain gage 31 is positioned over groove 25 between, and joined to, rim portion 27 and first island 28. A second strain gage 32 is positioned over groove 25 between, and joined to, first island 28 and second island 29. Both gages are spaced apart from hinge portion 30 and separated or freed therefrom by groove 25. Both gages are doped with boron to form P-type material. Also included is first conductor 34 extending across groove 25 between first island 28 and the rim portion. A second conductor 35 extends across the groove between second island 29 and the rim portion. The conductors and hinge portion 30 are spaced apart and separated or freed therefrom by groove 25. Both conductors are doped with boron to form P-type material. Accordingly, the intersection of the P-type material and the N-type material of the element forms an N-P junction. When viewed from a position directed perpendicularly from the planar surface of the substrate, as best illustrated in FIG. 1, first strain gage 31 and second strain gage 32 are oriented in substantially the same direction lying on a common axis. The strain gages of the instant invention may also be parallel to each other. Also, first conductor 34 and second conductor 35 are substantially parallel to each other, and the conductors are oriented substantially transversely with respect to the strain gages from this viewpoint. As will be explained in more detail hereinafter the first strain gage, the second strain gage, the first conductor, and the second conductor are all unitary members derived from the same silicon material of the substrate.

Transition slopes 37, 38, 39 and 40 provide a gradual transition between the raised peripheral rim and the raised second island, and the hinge portion. The transition slopes are formed along the (111) etch resistant plane by the etching process used to form groove 25, as will be explained in more detail hereinafter.

Metalized areas 41, 42 and 43 on rim portion 27 provide a metallic surface for connecting the strain sensitive element to outside circuitry. In the instant embodiment gages 31 and 32 and conductors 34 and 35 form approximately one-half of a wheatstone bridge so that the remainder of the bridge and associated circuitry may be attached to the metalized surfaces. Also provided are metalized surfaces 45 and 47 to enhance the conductivity of the circuit which is integral with first island 28 and second island 29. The metalized surfaces are surrounded by a boron rich portion, generally indicated as 49, similar in composition to the freed strain gages and the freed conductors. Portion 49 is desirable but not necessary and is conveniently formed when the strain gages and/or the conductors are formed.

The strain sensitive element of the present invention is extremely small in size having an approximate desirable length and width of generally about 0.035 inches (0.6 mm) and 0.045 inches (1.14 mm) respectively, and a thickness within the range of about 0.003 inches (0.076 mm) and 0.015 inches (0.381 mm). The gage and conductors are so small that they are difficult to see with the unaided eye. A representative size for an etch-freed strain gage is about 30 microns long, 6 microns wide and 1.5 microns thick, and a representative size for an etch- freed conductor is about 150 microns long, 18 microns wide and 12 microns thick.

Although the instant embodiment is described having two freed strain gages and two freed conductors, it is within the purview of the present invention to include embodiments having one or more freed strain gages and one or more freed conductors, and further to include embodiments having at least one freed strain gage and at least one freed conductor on each side of a planar substrate.

Referring to FIGS. 1-4, the instant embodiment comprises a piezoresistive half-bridge wherein first gage 31 and second gage 32 are active adjacent legs of the bridge. The remainder of the bridge includes externally supplied resistor 53, resistor 54, a source 51 of a direct current signal and a recorder system 52, such as a conventional amplifying system and recording oscillograph. External conductors 55, 56 and 57 are connected to metalized surfaces 41, 42 and 43 respectively so that all elements of the bridge are in electrical communication. The external conductors may be connected to the metalized surface using known wire bonding techniques.

In use, the rim 27 of the strain sensitive element may be sealed to a pressure source so that a pressure differential is applied across the element, in the direction of force P, and resisted by forces R1 and R2, as best illustrated in FIG. 2. The point of greatest deflection will be along the hinge between first island 28 and second island 29, indicated as bending axis 50, in FIG. 1. The pressure differential will cause the large island to tilt slightly downwardly flexing the hinge portion 30 under gage 32, causing the first island to tilt toward the second island. Accordingly, gage 31, extending between rim portion 27 and the first island will be in tension while gage 32 extending between the first island and the second island will be in compression caused by the tilt of the first small island toward the second large island through the bending hinge along bending axis 50. When current is flowing through the bridge the resistance of gage 31 will increase because it is stressed in tension and the resistance of gage 32 will decrease because it is stressed in compression. The change in resistance is related to the deflection within the element and accordingly related to the pressure P being measured so that the pressure experienced by the element can be measured and recorded.

It can be seen that the present invention provides a strain sensitive element for use in a system for converting mechanical movement into variations in electrical characteristics which may be used for such devices as accelerometers, pressure transducers, displacement gages and the like. The instant invention provides freed gages which are spaced from the hinge portion of the element to maximize sensitivity to bending along with freed integral conductors which provide minimum stiffness and therefore minimum interference with the movement of the element in response to the pressure or forces applied thereto.

Although the embodiment described herein above includes two freed gages, unsupported in their midportions, and two freed conductors, also unsupported in their midportions, wherein the gages and the conductors are an integral part of the underlying piezoresistive material of the element, it is within the purview of this invention to include strain sensitive elements having one or more etch freed gages in conjunction with one or more etch freed conductors.

Turning now to FIGS. 5a–5k, a sequence of steps is illustrated for producing a single sided piezoresistive strain sensitive element having a freed or suspended gage and a freed or suspended conductor therein. A first step in the process is to select a planar N-type silicon crystal element 70 with the plane of said element oriented (110) having a gage side 71 and an opposed back side 72. Element 70 is desirably within the range of between about 0.003 inch and 0.015 inch (0.076 mm and 0.381 mm) and preferably within the range of between about 0.0073 inch and 0.0077 inch (0.185 mm and 0.196 mm) thick. An oxide layer 74 is formed in a first forming step, on both sides of element 70 to a depth of about 0.5 micron, as best illustrated in FIG. 5a. It is also within the purview of the instant invention to include forming the oxide only on the gage side of the element, while protecting the back side, in the first forming step. It is preferred that the oxide layer is formed by oxidizing the surface of the substrate such as in a steam environment. It is also within the purview of the instant invention to form the oxide layer by depositing an oxide on the surface of the substrate. Also, coordinating indexes (not shown) can be established on the element for indexing both [111] directions, so that subsequent operations on the element, as will be explained in more detail hereinafter, will be performed along the proper direction with respect to the grain of the element. The coordinating index marks may be formed using a photolithographic process wherein indexing apertures (not shown) are opened in the oxide layer.

As illustrated in FIG. 5b, conductors indexed generally about [111] are defined on the gage side of the element using a photolithographic process causing the opening of conductor apertures 75 and 77 in oxide layer 74. These conductor apertures are shaped and oriented to define the desired conductor size and orientation. Also, the oxide is stripped from back side 72. If the oxide is only formed on the gage side of the element it will not be necessary to strip oxide from the back side.

In a next step, as illustrated in FIG. 5c, boron is diffused into the open conductor apertures 74 and 75 to achieve a boron density of substantially between about $3 \times 10^{19}$ and $10^{21}$ atoms of boron per cc of element material to a depth of substantially between about ten microns to twelve microns. This first diffusion step may be carried out by subjecting the element to a temperature of about 1140° C., in the presence of a source of boron such as $B_2O_3$ for approximately 15 hours, to produce the desired boron density to the desired depth of substantially between about 5 microns to 25 microns to form the conductors which are illustrated as 78 and 79 in FIG. 5c. The first diffusion step also infuses boron 80 into the back side of the element. However, as will be explained in more detail hereinafter, it is not necessary to infuse boron into the back side of the element, only desirable.

Following the first diffusion step, as best illustrated in FIG. 5d, residual oxide layers, (74 in FIG. 5c) are stripped from the gage side of the element, preferably in a process using hydrofluoric acid, and a new oxide layer 81 is then formed on both sides of the element to a depth of approximately 0.5 micron. It should be noted that the stripping of the residual oxide and forming a new oxide layer is not a necessary step, but an optional, desirable, step. Some photolithographic processes work better with a fresh oxide layer that has not been subjected to the conditions of a boron infusion step.

Referring to FIG. 5e, a second defining step is performed on the gage side, using photolithographic means, to define a strain gage indexed about [111] on the oxide layer and to open the oxide layer, preferably in a process using buffered hydrofluoric acid, so that the opening corresponds with the size and orientation of the defined strain gage. It should be noted that it is preferred that the orientation of the strain gage with respect to the crystal grain structure be held to a relatively tight tolerance, for example, within 1° because deviations from the [111] direction affect the sensitivity of the strain gage. However, it is not as critical to control the angle of the conductors and variations may be allowed to accommodate other functions in the process or the product, for example plus or minus 15° may be acceptable in some situations. However, it is within the purview of the present invention to include etch-freed strain gages which deviate at greater angles from the [111] direction because in some situations less sensitivity may be tolerable and even desirable.

In a second diffusion step, boron is diffused into the aperture to form strain gage 82 as illustrated in FIG. 5f. This second diffusion step is carried out under conditions sufficient to provide a boron density of substantially between about $3 \times 10^{19}$ and $10^{21}$ atoms of boron per cc of gage material to a depth of substantially about 0.5 micron to 5 microns, and preferably about 1.5 microns to 1.6 microns. This second diffusion step may be carried out by subjecting the element to a temperature of about 1105° C., in the presence of a source of boron such as $B_2O_3$, for approximately 90 minutes. It will be apparent to one skilled in the art that a wide variety of time and temperature combinations may be used in the boron diffusion steps, with lower temperatures requiring longer times and vice versa and that the times and temperatures recited herein are representative of these many possible combinations. At this step the conductors and the strain gage are formed in the substrate. It should be noted that, as a matter of choice, the second defining step also results in the oxide layer being stripped from over the conductors which have been previously infused with boron. If the oxide layer is not removed from over the conductors, some of the boron therein may be lost because of the high temperatures experienced in the second diffusion step. However, by exposing the conductors to the second diffusion step, the boron concentration of the conductors is maintained. It should also be noted that this process may be used to form one or more conductors and one or more strain gages, and the embodiment having two conductors and one strain gage, illustrated in FIGS. 5a–5k, is representative of the many possibilities. Also, although the strain gage and the conductors appear to be in alignment, the conductors are oriented substantially transversely with respect to the strain gage as shown in FIG. 1 hereinabove. This is not readily apparent from the side elevation views of FIGS. 5a–5k.

Following the second boron infusion step the residual oxide layers (shown as 81 in FIG. 5f) are stripped from the element and, in a third depositing step, an oxide layer 83, as illustrated in FIG. 5g, is formed on both sides of the element. It should be noted that the stripping of the residual oxide and forming a new oxide layer is not a necessary step but an optional, desirable, step. As mentioned hereinabove, some photolithographic processes work better with a fresh oxide layer that has not been subjected to the conditions of a boron infusion step.

At this point in the process, the element is ready for the steps which will produce the groove which will provide the hinge portions of the element and separate these hinge portions from one of the conductors and the strain gage. Referring now to FIG. 5h, in a third defining step, an etching pattern is opened on the gage side to define a groove to be formed in the element over which one of the conductors and the strain gage will extend. This third defining step is performed using a photolithographic process wherein portions of oxide layer 83 are removed to define the groove, preferably in a process using buffered hydrofluoric acid. Also, the oxide layer is stripped from the back side of the element. It should be noted that if an oxide layer is not formed on the back side of the element, as eluded to above, it will obviously not be necessary to provide for the stripping of an oxide layer.

At this point the element is prepared for the etching step. Etching may be performed using a potassium hydroxide-water-isopropyl alcohol bath. Preferably, an ethylene diaminepyrocatechol etch is utilized. During the etching procedure, areas protected by oxide and areas heavily doped with boron do not readily etch. Accordingly, as illustrated in FIG. 5i, a groove will be formed in the shape defined in the third defining step. The etching procedure is performed to a depth necessary to undercut the conductor and the strain gage. Preferably, the etching procedure is performed to a depth which will produce a residual thickness at the base of the groove within the range of about 0.0001 inch and 0.003 inch depending on the function the transducer will perform. This etching step can be performed in generally about four hours, depending on the process parameters. The etching step produces groove 85 over which the conductor 79 and strain gage 82 pass. It is desirable to control the etching step so that the residual thickness at the base of the groove is controlled. The base or base portion is the area of deepest penetration of the groove into the element. The base portion and the back side define the residual thickness. This control is desirable because the residual thickness will determine the relative stiffness of the element which must be matched to the anticipated pressures and/or forces that will be experienced by the element in actual use. For example, an element that is not stiff enough may be damaged in use, and an element that is too stiff may lack the sensitivity for the intended use.

One way to control the depth of the etch, and therefore the residual thickness, is to control the process and to discontinue the etching when the desired residual thickness is achieved. Another way to help control the depth of the etch is to provide an etch-stop at the residual thickness such as a boron rich portion or an oxide, both of which do not readily etch. In the process described herein, the boron infused on the back of the element during the first infusion step, as best illustrated in FIG. 5c, acts as an etch-stop. If the boron is infused into the back side, to the depth of the desired residual thickness, then the etching process will stop removing material when the boron rich residual layer is exposed. Accordingly, providing an etch-stop is not necessary but is a desirable, optional, step in the instant process.

At this point in the process a strain sensitive element having an etch-freed conductor and an etch-freed strain gage extending across the groove, without any separate support, has been formed. The remaining steps in the process are performed to form a surface which is adapted to the electrical communication with exterior circuits, and to cut the element to a proper size.

Adverting now to FIG. 5j, in a fourth forming step, an oxide layer 84 is formed on all surfaces accessible from the gage side of the element while protecting the back side of the element. In a fourth defining step, using a photolithographic process, a contact pattern is developed by opening contact windows in the oxide layer along the gage surface. It should be noted that the fourth forming step can allow oxide to form on the back side of the element. The oxide formed on the back side can be stripped therefrom during the fourth defining step or left intact. In a first depositing step, the contact windows are then subject to a metalizing process, such as physical vapor deposition, to produce contact surfaces 87, 88 and 89 which may be used to join the element to outside circuitry using known wire bonding techniques. The contact surfaces may be made of metals such as gold, aluminum and platinum with aluminum being preferred for most applications.

Referring now to FIG. 5k, the element is cut from the substrate using cutting means such as a diamond saw or an ultrasonic impact grinder to produce an element of the exact size desired having sides 90.

The process for making a strain sensitive transducer element, described hereinabove, utilizes two separate boron infusion steps. The reason that there are two boron infusion steps is that it is preferred that the resistance of the etch-freed conductor should be less than the resistance of the etch-freed strain gage because it is desirable to have as little resistance as possible in the conductor so that the conductor does not affect the electrical output of the test procedure. However, there are other ways to provide conductors which have less effective resistance than the strain gages, for example, forming multiple conductors crossing the groove in parallel and/or placing the strain sensitive elements in an electrical series. Also, rather than infusing more boron during the infusion step which develops the conductors, it may be possible to make the conductors have more surface area to absorb the boron so that the same depth of infusion will provide a larger conductor. Knowing this, there is described hereinbelow another embodiment of the present invention which is a process for producing a strain sensitive element having at least one etch-freed piezoresistive strain gage and at least one etch-freed conductor passing over a groove in the element wherein the element is produced using only one infusion step rather than two steps as described above.

Figure 6A:
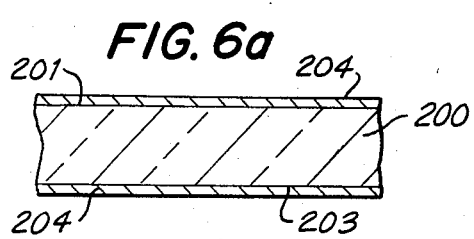
FIGS. 6a through 6h are cross-sectional views showing successive steps of another method of manufacturing the strain sensitive element of the present invention.

Turning now to FIGS. 6a–6h, a sequence of steps is illustrated for producing a piezoresistive strain sensitive element having a freed or suspended conductor therein. A first step in the process is to select a planar N-type silicon crystal element 200 with the plane of said element oriented (110) having a gage side 201 and an opposite back side 203. Element 200 is desirably within the range of about 0.0073 inch and 0.0077 inch (0.185 mm and 0.196 mm) thick. An oxide layer 204 is formed, in a first forming step, on both sides of element 200 to a depth of generally about 0.5 micron, as best illustrated in FIG. 6a. It is also within the purview of the present invention to include forming the oxide only on the gage side of the element, while protecting the back side, in the first forming step. Also, coordinating indexes (not shown) may be established on the element for indexing both [111] directions, so that subsequent operations on the element will be performed along the proper directions with respect to the grain of the element. The coordinating index marks may be formed using a photolithographic process wherein indexing apertures (not shown) are opened in the oxide layer.

Figure 6B:
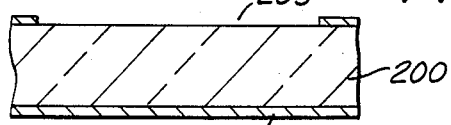

As illustrated in FIG. 6b, conductors indexed generally about [111] and a strain gage indexed [111] are defined on the gage side of the element using a photolithographic process causing the opening of conductor apertures and a strain gage aperture (all indicated as 205) in oxide layer 204. These apertures are shaped and oriented to define the desired conductors, in size and orientation, and the desired strain gage in size and orientation. Also, during portions of the photolithographic process, it is desirable to protect oxide layer 204 on back side 203 because the compounds used to open the conductor apertures in the strain gage aperture will also attack the oxide on the back side. In the alternative, the oxide could remain unprotected and the photolithographic process allowed to interact with the oxide. Also, if oxide is not formed on the back side, no protection is necessary.

Figure 6C:
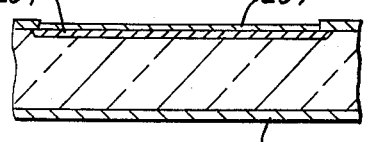

In a next step, as illustrated in FIG. 6c, boron is diffused into the open conductor apertures and strain gage aperture to achieve a boron density of substantially between about $3 \times 10^{19}$ and $10^{21}$ atoms of boron per cc of element material to a depth of substantially about 0.5 micron to 5 microns, and preferably about 1.5 microns to 1.6 microns. This diffusion step may be carried out by subjecting the element to a temperature of about 1105° C. for substantially about 90 minutes, in the presence of a boron source such as $B_2O_3$ to form the conductors and the strain gage illustrated generally as 207 in FIG. 6c. Following the diffusion step, as best illustrated in FIG. 6c, a new oxide layer 209 is then formed on the gage side of the element to a depth of about 0.5 micron. It should be noted that the forming of a new oxide layer is not a necessary step, but an optional, desirable, step as explained hereinabove.

Figure 6D:
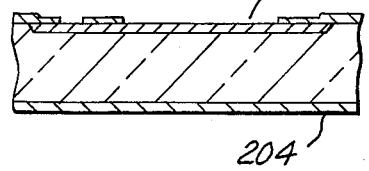
Figure 6E:
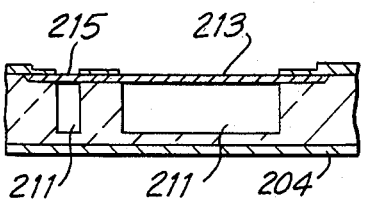

At this point in the process, the element is ready for the steps which will produce the groove which will provide the hinge portions of the element and separate these hinge portions from one of the conductors and the strain gage. Referring now to FIG. 6d, in a second defining step, an etching pattern is opened on the gage side to define a groove to be formed in the element over which one of the conductors on the strain gage will extend. This second defining step is performed using a photolithographic process wherein portions of oxide layer 209 are removed to define the groove, preferably in a process using buffered hydrofluoric acid. Also, it is desirable to protect the oxide layer on the back side during this process. In the alternative, if no oxide is formed on the back side no protection is necessary. As a result of the second defining step, a groove aperture 210 is defined on the gage side of the element.

At this point the element is prepared for the etching step. Etching may be performed using potassium hydroxide-water-isopropyl alcohol bath. Preferably, an ethylene diamine-pyrocatechol etch is utilized. During the etching procedure, areas protected by oxide and areas heavily doped with boron do not readily etch. Accordingly, a groove will be formed in the shape defined in the second defining step. The etching procedure is performed to a depth necessary to undercut the conductor and the strain gage. Preferably, the etching procedure is performed to a depth which will produce a residual thickness at the base of the groove within the range of about 0.0001 inch and 0.003 inch depending on the function the transducer will perform. This etching step can be performed in generally about four hours depending on the process parameters. The etching step produces groove 211 over which conductor 213 and strain gage 215 pass.

At this step in the process a strain sensitive element having an etch-freed conductor and an etch-freed strain gage extending across the groove, without any separate support, has been formed. The remaining steps in the process are performed for the purpose of forming a surface which is adapted to the electrical communication with exterior circuits, and to cut the element to a proper size.

Figure 6F:
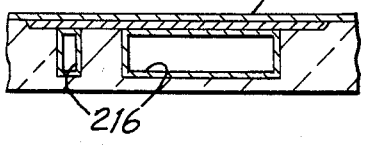

Adverting now to FIG. 6f, all residual oxide is stripped, in a first stripping step, from the element. Then, forming, in a third forming step, an oxide layer 216 is formed on all surfaces of the element accessible from said gage side.

Figure 6G:
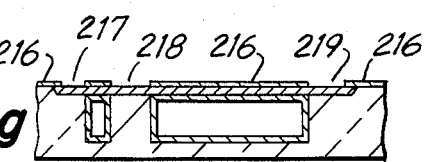

Referring to FIG. 6g, in a third defining step, using a photolithographic process, a contact pattern is developed by opening contact windows 217, 218 and 219 respectively in oxide layer 216 along the gage surface.

Figure 6H:
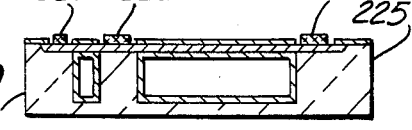

Referring now to FIG. 6h, in a first depositing step, the contact windows are subject to a metalizing process to produce contact surfaces 221, 222 and 223 which may be used to join the element to outside circuitry using known wire bonding techniques. Finally, the element is cut from the substrate using cutting means such as a diamond saw or an ultrasonic impact grinder to produce an element of the exact size desired having sides 225. Also, another etching step can be used to free the element or separate the elements.

Although the processes described hereinabove recite the steps to produce one strain sensitive element. These steps are also applicable to a process using a substantially larger substrate so that a plurality of elements may be formed thereon. When multiple elements are formed, the final step involves the cutting of the substrate to produce a plurality of defined elements. It is preferred that the process described hereinabove be used to produce a plurality of elements from one substrate.

Thus, it can be seen that the present invention provides a simple, straightforward, reliable, easily fabricated, strain sensitive element having at least one etch-freed piezoresistive strain gage and at least one etch-freed conductor passing over a groove in the element, wherein the strain gage, the conductor and the element are all formed from the same silicon crystal substrate.

What is claimed is:

1. A process for producing an operable strain sensitive element having at least one etch-freed piezoresistive strain gage and at least one etch-freed conductor passing over a groove in the element, comprising:
   (a) selecting a planar N-type silicon crystal element with the plane of said element oriented substantially about (110), said element having a gage side and an opposed back side;
   (b) forming, in a first forming step, an oxide layer on said gage side of said element;
   (c) defining, in a first defining step, on said oxide layer of said gage side, a conductor indexed generally about [111] by opening a conductor aperture in said oxide layer corresponding to said defined conductor;
   (d) diffusing, in a first diffusion step, boron into said conductor aperture from said first defining step;
   (e) defining, in a second defining step, on said oxide layer of said gage side, a strain gage indexed about

[111] by opening a gage aperture in said oxide layer corresponding to said defined strain gage;

(f) diffusing, in a second diffusion step, boron into said gage aperture from said second defining step;

(g) defining, in a third defining step, an etching pattern on said gage side defining a groove to be formed in said element over which said conductor and said strain gage will extend;

(h) etching, in an etching step, in said etching pattern to a depth necessary to undercut said conductor and said strain gage and to form said groove, said groove having a base portion at the area of deepest penetration of said groove into said element, said base portion and said back side defining a residual thickness in said element;

(i) stripping, in a stripping step, the residual oxide layers from said element;

(j) forming, in a fourth forming step, an oxide layer on all surfaces accessible from said gage side of said element;

(k) defining, in a fourth defining step, a contact pattern on said gage side defining contacts; and (l) depositing, in a first depositing step, a metallic layer in said contact pattern, said metallic layer adapted to be connected with outside conductors.

2. The process of claim 1 applied to a silicon crystal large enough to form a plurality of strain sensitive elements.

3. The process of claim 2 further including a cutting step, following said first depositing step, for separating said silicon crystal into separate strain sensitive elements.

4. The process of claim 1 wherein said first forming step provides an oxide coating of about 0.5 micron thick.

5. The process of claim 1 wherein said first diffusion step is carried out under conditions sufficient to provide a boron density of substantially between about $3 \times 10^{19}$ and $10^{21}$ atoms of boron per cc to a depth of substantially between about 15 microns to 25 microns.

6. The process of claim 1 wherein said second diffusion step is carried out under conditions sufficient to provide a boron density of substantially between about $3 \times 10^{19}$ and $10^{21}$ atoms of boron per cc to a depth of substantially between about 0.5 micron and 5 microns.

7. The process of claim 1 wherein said second diffusion step is carried out under conditions sufficient to provide a boron density of substantially between about $3 \times 10^{19}$ and $10^{21}$ atoms of boron per cc to a depth of substantially between about 1.5 microns and 1.6 microns.

8. The process of claim 1 wherein said etching step is carried out in a bath containing ethylene diamine, pyrocatechol and water.

9. The process of claim 1 wherein said planar element is within the range of between about 0.003 inch and 0.015 inch thick.

10. The process of claim 1 wherein said planar element is within the range of between about 0.0073 inch and 0.0077 inch thick.

11. The process of claim 10 wherein said etching step is carried out to a depth so that said residual thickness is within the range of between about 0.0001 inch and 0.003 inch.

12. The process of claim 1 wherein said first defining step and said second defining step are carried out using photolithography.

13. The process of claim 1 wherein said third defining step and said fourth defining step are carried out using photolithography.

14. The process of claim 1 further including an establishing step, after said first forming step, for establishing coordinating indexes on said element for indexing both [111] directions.

15. The process of claim 1 further including a second stripping step, following said first diffusion step, for stripping the residual oxide layers from said first forming step and a second forming step, following said second stripping step, for forming an oxide layer on said gage side of said element.

16. The process of claim 1 further including a third stripping step, following said second diffusion step, for stripping the residual oxide layers from said second forming step and a third forming step, following said third stripping step, for forming an oxide layer on said gage side of said element.

17. A process for producing an operable strain sensitive element having at least one etch-freed piezoresistive strain gage and at least one etch-freed conductor passing over a groove in the element, comprising:

(a) selecting a planar N-type silicon crystal element with the plane of said element oriented substantially about (110), said element having a gage side and an opposed back side;

(b) forming, in a first forming step, an oxide layer on said gage side of said element;

(c) defining, in a first defining step, on said oxide layer of said gage side, a conductor indexed generally about [111] and a strain gage indexed about [111] by opening a conductor aperture and a strain gage aperture in said oxide layer corresponding to said defined conductor and said defined strain gage;

(d) diffusing, in a diffusion step, boron into said apertures from said first defining step;

(e) defining, in a second defining step, an etching pattern on said gage side defining a groove to be formed in said element over which said conductor and said strain gage will extend;

(f) etching, in an etching step, in said etching pattern to a depth necessary to undercut said conductor and said strain gage and to form said groove, said groove having a base portion at the area of deepest penetration of said groove into said element, said base portion and said back side defining a residual thickness in said element;

(g) stripping, in a stripping step, the residual oxide layers from said element;

(h) forming, in a second forming step, an oxide layer on all surfaces of said element accessible from said gage side;

(i) defining, in a third defining step, a contact pattern on said gage side defining contacts; and (j) depositing, in a first depositing step, a metallic layer in said contact pattern, said metallic layer adapted to be connected with outside conductors.

18. The process of claim 17 applied to a silicon crystal large enough to form a plurality of strain sensitive elements.

19. The process of claim 18 further including a cutting step, following said first depositing step, for separating said silicon crystal into separate strain sensitive elements.

20. The process of claim 17 wherein said first forming step provides an oxide coating of about 0.5 micron thick.

21. The process of claim 17 wherein said diffusion step is carried out under conditions sufficient to provide a boron density of substantially between about $3 \times 10^{19}$ and $10^{21}$ atoms of boron per cc to a depth of substantially between about 0.5 micron and 5 microns.

22. The process of claim 17 wherein said diffusion step is carried out under conditions sufficient to provide a boron density of substantially between about $3 \times 10^{19}$ and $10^{21}$ atoms of boron per cc to a depth of substantially between about 1.5 microns and 1.6 microns.

23. The process of claim 17 wherein said etching step is carried out in a bath containing ethylene diamine, pyrocatechol and water.

24. The process of claim 17 wherein said planar element is within the range of between about 0.003 inch and 0.015 inch thick.

25. The process of claim 17 wherein said planar element is within the range of between about 0.0073 inch and 0.0077 inch thick.

26. The process of claim 17 wherein said etching step is carried out to a depth so that said residual thickness is within the range of between about 0.0001 inch and 0.003 inch.

27. The process of claim 17 wherein said first defining step, said second defining step and said third defining step are carried out using photolithography.

28. The process of claim 17 further including an establishing step, after said first forming step, for establishing coordinating indexes on said element for indexing both [111] directions.

29. The process of claim 17 further including a forming step, before said etching step, for forming an oxide layer on said back side of said element.

* * * * *